United States Patent [19]

Lee

[11] 4,297,678

[45] Oct. 27, 1981

[54] AIRCRAFT SAFETY ALARM SYSTEM

[76] Inventor: Byung H. Lee, Suite 203, 1810 Craig Rd., St. Louis, Mo. 63101

[21] Appl. No.: 7,195

[22] Filed: Jan. 29, 1979

[51] Int. Cl.³ .............................................. C08B 3/10
[52] U.S. Cl. .................................. 340/328; 340/309.1
[58] Field of Search ................. 340/328, 52 R, 309.1

[56] References Cited

U.S. PATENT DOCUMENTS

| | | | |
|---|---|---|---|
| 3,221,211 | 11/1965 | Murphy | 340/52 R |
| 3,455,410 | 7/1969 | Wilson | 340/52 R |
| 3,995,268 | 11/1976 | Ferrari | 340/52 R |
| 4,024,494 | 5/1977 | Quesnel | 340/52 R |
| 4,097,839 | 6/1978 | Lesiak | 340/52 R |

Primary Examiner—Harold I. Pitts
Attorney, Agent, or Firm—Michael Kovac

[57] ABSTRACT

An aircraft safety alarm system for sounding an alarm that the aircraft engine may be started including outside mounted speaker alarm means and a switch activated by a user that couples a timer device to an alarm circuit for sounding an alarm outside the aircraft for a predetermined time period. The switch may be operated upon opening the aircraft door, operating the aircraft ignition switch or by fastening seat belts.

5 Claims, 3 Drawing Figures

AIRCRAFT SAFETY ALARM SYSTEM

SUMMARY OF THE INVENTION

It is well known that it is dangerous to be in the vicinity of prop or jet aircraft when the aircraft engines are operating. This problem is particularly acute at the time the aircraft engine is started since there is no advance warning, such as from the sound of the aircraft engine, that safe distances should be maintained.

In commercial aircraft, care is taken by the various commercial airlines to insure that all personnel are kept safe distances from the aircraft when it is started and when it is operating. However, such personnel are unavailable for private or non-commercial aircraft; also known as general aviation aircraft.

Thus, there has been a long felt need for an aircraft safety alarm system which signifies to all personnel in the vicinity of the aircraft that it may be started.

More specifically, it is an object of the present invention to provide an advance sound warning, for a predetermined time period, that an aircraft engine may be started.

Another object of the present invention is to provide an airplane safety alarm system that is both a safety alarm and a travel alert, such as by producing an intermittent audio sound that is or will become familiar to air travelers.

These and other objects and advantages of the present invention are attained by the provision of an aircraft safety alarm system for sounding an alarm that the aircraft engine may be started including speaker alarm means located outside the aircraft and being connected in an electrical circuit to a switch that is activated by a user of the aircraft, said electrical circuit being connected to a source of power and including an alarm circuit and a timer device, said timer device being activated by said switch to operate said alarm circuit for a predetermined time period to operate the speaker alarm means, said timer device becoming deactivated after said predetermined time period to de-energize said alarm circuit and said speaker alarm means.

DESCRIPTION OF PREFERRED EMBODIMENTS

The present invention relates to an aircraft safety alarm system which is designed to produce a loud, intermittent alarm for a predetermined time period, outside the aircraft to alert the users of the aircraft as well as others in the vicinity of the aircraft that the engine is about to be started. As is well known, there have been serious injuries to people who are nearby the propellar blades or jet engine of aircrafts. There is presently no known system which has been developed for this purpose.

In addition to being a safety alarm, the audio sound that is developed by the present invention is designed to produce intermittent sounds (such as ½ second intervals) to constitute a pleasant travel alert sound. For example, some subway and streetcar vehicles produce an intermittent ringing or clanging sound that is familiar to ground travelers as an indication of an approaching or departing vehicle. Since an aircraft prior to passenger loading or passenger disembarking after landing is a ground vehicle, it is believed that a safety alarm and travel alert sound could be usefully employed.

While the aircraft safety alarm system can be operated upon opening the aircraft passenger door, fastening the pilot or passenger seat belts or inserting the aircraft key into the ignition, it is believed that the aircraft safety alarm system is best activated upon opening the aircraft passenger door since this will give the most advanced warning of passenger loading or disembarkation.

Figure 1:
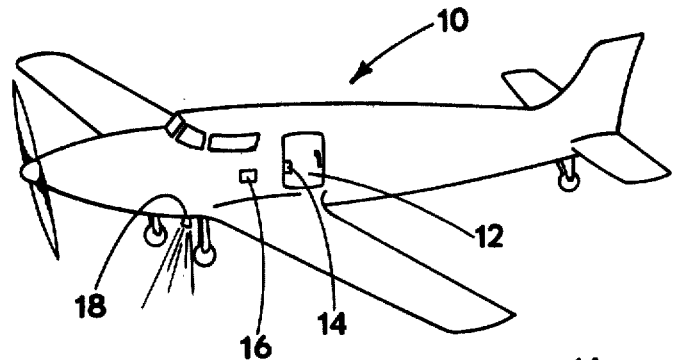
FIG. 1 is a perspective view of a general aviation type aircraft which is shown as including an aircraft safety alarm system which is constructed in accordance with the teachings of the present invention.
Figure 2:
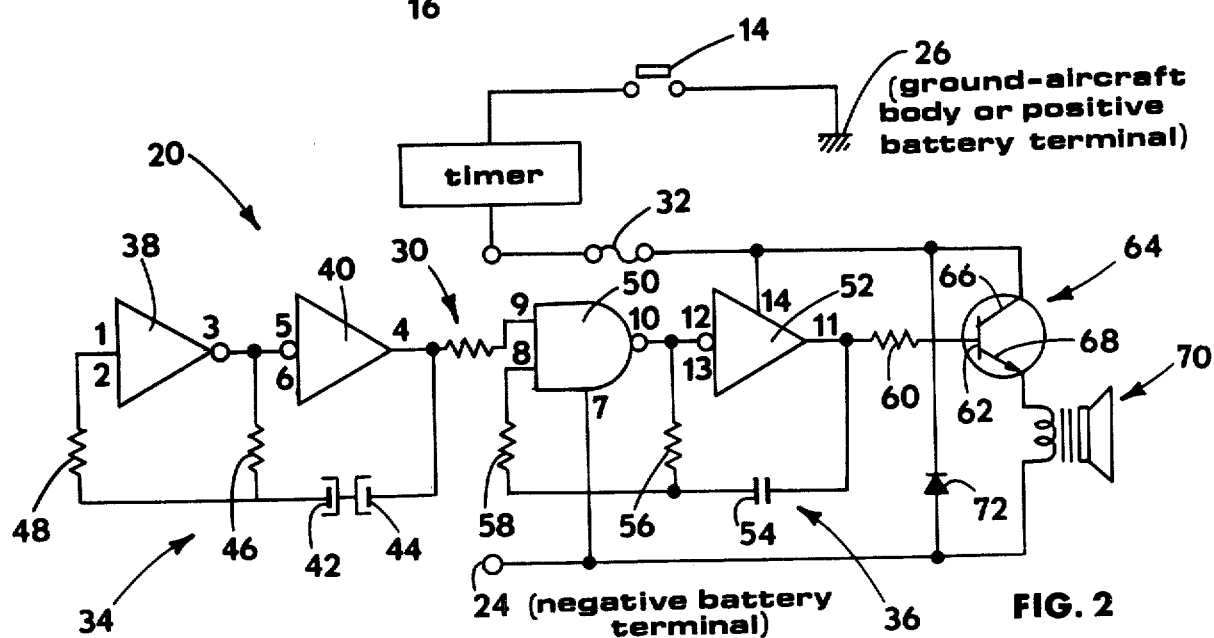
FIG. 2 is an electrical schematic diagram of a positive ground system type of aircraft safety alarm system.
Figure 3:
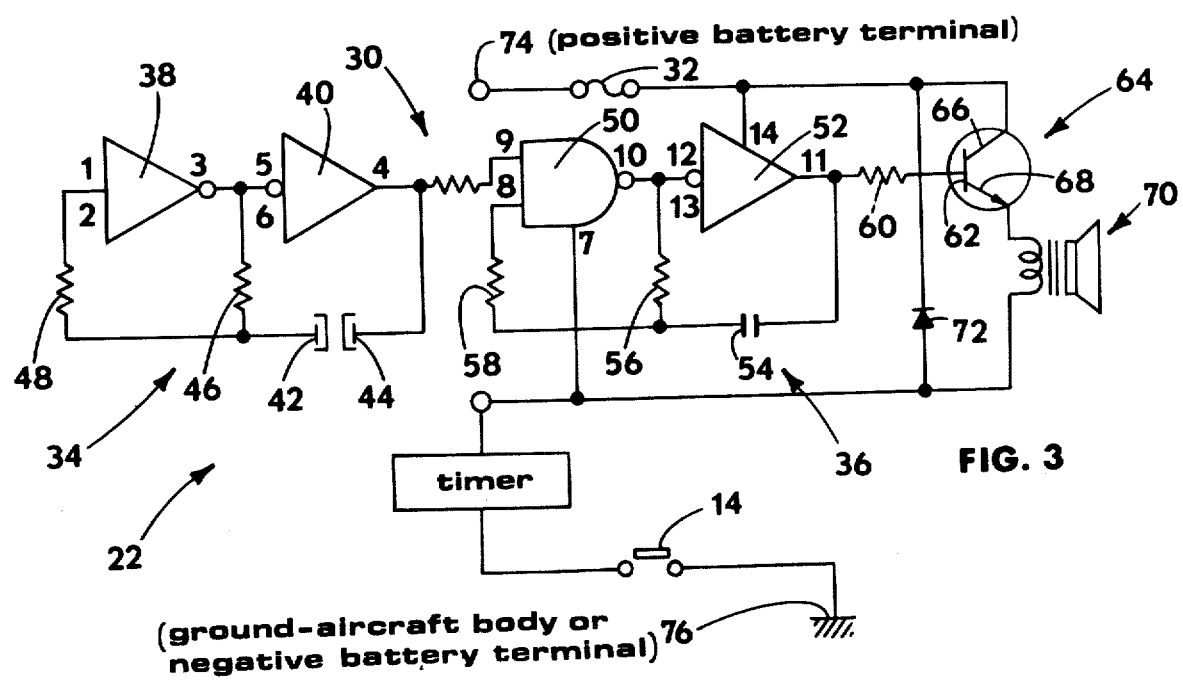
FIG. 3 is an electrical schematic diagram of a negative ground system type of aircraft safety alarm system.

With the above general background information, reference is now made to FIGS. 1-3 of the drawing for a specific description of the preferred embodiments of the present invention.

The general aviation airplane 10 shown in FIG. 1 has a passenger door 12 with a door switch 14 that is designed to activate the aircraft safety alarm system 16 which is shown mounted on the outside of the airplaine 10 adjacent the passenger door. The actual mounting of the aircraft safety alarm system 16 may be either on the exterior or interior of the airplane; however, the speaker alarm means 18 is preferably mounted on the exterior of the airplane and preferably also in a direction toward the ground to obtain a reverberation of the sound. This will make the sound louder, which may be useful particularly if another airplane's engine is operating nearby.

The circuit diagram of FIG. 2 shows a positive ground system type 20 of aircraft safety alarm system, while FIG. 3 shows a negative ground system type 22 of aircraft safety alarm system.

In the electrical circuit diagram of FIG. 2, the positive ground system type 20 of aircraft safety alarm system is connected at 24 to the negative battery terminal of the aircraft battery (not shown) and is connected at 26 to ground, which can be either the aircraft body or positive battery terminal. The circuit diagram shows the switch 14 which, when closed, completes the circuit to the aircraft battery to activate a timer 28, shown schematically, which is designed to operate the alarm triggering circuit (generally shown by the numeral 30) for a predetermined time period. The timer device 28 is of the type that can be adjusted to a preset time period, for example, 3 to 10 seconds, to allow current to flow for the preset period and then automatically shuts off current flow. In order to reactivate the timer device 28, the switch 14 must be reclosed. Thus, the timer device 28 controls the aircraft safety alarm for operation only within a predetermined time period. The audio sound that is to be produced will therefore, be limited to the pre-selected time period set by the user.

Between the timer device 28 and the alarm triggering circuit 30 is a fuse 32 to prevent damage to the system caused by power overloading.

The alarm triggering circuit 30 comprises an integrated circuit (14 pin electronic component) which includes a base oscillator circuit 34 and a audio oscillator circuit 36 that is connected to the various pins 1-14 as shown.

In the base oscillator circuit 34, there are two oscillators or gates 38,40 connected at pins 1-3 and 4-6, respectively, in the integrated circuit to produce an intermittent current pulse at intervals of about ½ second. Included within the base circuit are also capacitors 42,44 and resistors 46, 48 which are connected, as shown, to the various pin locations in the integrated circuit. When the base oscillator circuit 34 is constructed in the manner just described, it forms a free running astable multivibrator to produce the intermittent current pulse at approximately ½ second intervals. The value of the capacitors 42, 44 and resistors 46, 48 determines the length of the intermittent current pulse generated in the base circuit 34 of the integrated circuit.

When the generating power of oscillator or driver 40 is high enough, for example at about 800 HZ it will trigger the audio oscillator circuit 36. IN the audio oscillator circuit 36, there are also two oscillators or drivers 50, 52 which are connected at pins 8-10 and 12-14, respectively, in the integrated circuit and which produces an intermittent audio tone. The transmitting circuit 36 further includes capacitor 54 and resistors 56, 58, whose values again determine the intermittent current pulse transmitted to the remaining parts of the alarm triggering circuit 30. The audio oscillator cirucit 36 is gated, as compared with the base oscillator circuit 34 and greater at a different period of oscillation.

From the base oscillator and audio oscillator circuits 34, 36 respectively, of the integrated circuit, the intermittent pulsed audio tone is coupled through the resistor 60 to the base 62 of the low frequency transistor amplifier 64. The collector 66 of the transistor 64 is electrically coupled, through the fuse 32 and timer 28 to ground 26. The emitter 68 of the transistor 64 is, on the other hand, electrically coupled to the speaker alarm means 70 which, in turn, is connected back to the negative battery terminal 24. A diode 72 is also electrically coupled with the transistor 64 and speaker alarm means 70 as shown.

The transistor 64, is designed to produce a low frequency amplification of the intermittent pulsed audio tone emanating from the base oscillator and audio oscillator circuits 34, 36 of the integrated circuit. This will then cause activation of the speaker alarm means 70 to produce an intermittent sound for the predetermined time period set by the timer device 28. After the preset time period of the timer device 28 has run, the entire positive ground system type 20 of aircraft safety alarm system will remain de-activated until the switch 14 is re-closed.

In the negative ground system type 22 of aircraft safety alarm system shown in FIG. 3, the collector 66 of the transistor 64 is coupled through the fuse 32 to the positive battery terminal 74 while the ground 76 (aircraft body or negative battery terminal) is coupled in the circuit through one side of the speaker alarm means 70, as shown. In all other respects, the negative ground system type 22 of aircraft safety alarm system shown in FIG. 3 operates in the mount described in the FIG. 2 positive ground system type 20 of aircraft safety alarm system.

From the foregoing, it will be appreciated that the aircraft safety alarm system of the present invention provides an intermittent alarm outside the aircraft for a predetermined time period to alert users of the aircraft and others in the vicinity thereof that the aircraft engine is about to be started. This invention thus solves a long felt need of a safety and travel alarm for airplanes, while on the ground, and thus will help to prevent serious injury while establishing a familiar loading or disembarking sound for air travelers. The invention may also find application for other types of vehicles, including boats in particular, where a safety and travel alarm would be useful!

I claim:

1. An aircraft safety alarm system for sounding an alarm that the aircraft engine may be started, comprising speaker alarm means located outside the aircraft and being connected in an electrical circuit to a switch that is automatically activated by the aircraft operator prior to operating the aircraft, said electrical circuit being connected to a battery and including an alarm circuit and a timer device, said timer device being automatically activated by said switch to operate said alarm circuit for a predetermined time period to activate the speaker means, said timer device becoming de-activated after said predetermined time period to de-energize said alarm circuit and said speaker alarm means, said alarm circuit further including a base oscillator circuit and an audio oscillator circuit to produce an intermittent sound through the speaker alarm means, said audio oscillator circuit being operated at a frequency different than the base oscillator circuit, and audio amplifying means for amplifying the audio tone through the speaker alarm means, said speaker alarm means further including means to produce an intermittent sound that is both a safety alarm as well as a travel alert.

2. The aircraft safety alarm system as defined in claim 1 wherein said speaker alarm means is directed downwardly to the ground to cause the sound waves to be directed there against.

3. The aircraft safety alarm system that is defined in claim 1 wherein said switch is activated upon opening the door or the aircraft.

4. The aircraft safety alarm system that is defined in claim 1 wherein said switch is activated when the ignition switch of the aircraft is operated.

5. The aircraft safety alarm system that is defined in claim 1 wherein said switch is activated by fastening the seat belts on the aircraft.

* * * * *